(12) United States Patent
Smith et al.

(10) Patent No.: US 7,210,111 B1
(45) Date of Patent: *Apr. 24, 2007

(54) SYSTEMS AND METHODS FOR CONDUCTING FUTURE SIGNAL CHECKS

(75) Inventors: Zachary Steven Smith, Ft. Collins, CO (US); John Warren Maly, Laporte, CO (US); Ryan Clarence Thompson, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 291 days.

This patent is subject to a terminal disclaimer.

(21) Appl. No.: 10/838,761

(22) Filed: May 4, 2004

(51) Int. Cl.
  *G06F 9/45* (2006.01)
  *G06F 17/50* (2006.01)
(52) U.S. Cl. ............ 716/6; 716/4; 716/5; 716/18
(58) Field of Classification Search ........ 716/4–7, 716/10–18; 714/1–57, 100; 703/1–4, 13–27; 702/57–84; 326/9–15, 93–102; 327/1–9, 327/13–99
See application file for complete search history.

(56) References Cited

U.S. PATENT DOCUMENTS 5,799,022 A * 8/1998 Williams .............. 714/797
5,993,055 A * 11/1999 Williams .............. 714/732
6,487,704 B1 * 11/2002 McNamara et al. ........ 716/5
6,948,092 B2 * 9/2005 Kondo et al. ............ 714/12

OTHER PUBLICATIONS

Tseng et al., Static Noise Analysis with Noise Window, Jun. 2003, ACM, pp. 864-868.*
Chen et al., Refining Switching Window by Time Slots for Crosstalk Noise Calculation, 2002, IEEE, pp. 583-586.*

* cited by examiner

*Primary Examiner*—Jack Chiang
*Assistant Examiner*—Nghia M. Doan (57) ABSTRACT

In one embodiment, a system and method pertain to identifying an output signal having indeterminate timing, creating an expectation for a signal change associated with the output signal, and adding the expectation to an ordered list of expectations for the output signal. In another embodiment, a system and method pertain to detecting a signal change, identifying a vector associated with the signal in which the change occurred, examining pending expectations of the vector until a mature expectation is identified, comparing an expected value contained in the mature expectation with the detected signal change, and reporting an error if the expected value does not match the detected signal change.

18 Claims, 7 Drawing Sheets

SYSTEMS AND METHODS FOR CONDUCTING FUTURE SIGNAL CHECKS

BACKGROUND

Computer processor design is an extremely complex and lengthy process. The design process includes a range of tasks from high-level tasks such as specifying the architecture down to low-level tasks such as determining the physical placement of transistors on a silicon substrate. Each stage of the design process also involves extensive testing and verification of the design through that stage. One typical stage of processor design is to program the desired architecture for the processor using a register transfer language (RTL). The desired architecture is represented by an RTL specification that describes the behavior of the processor in terms of step-wise register contents. The RTL specification models what the processor does without describing the physical circuit details. Thus, the processor architecture can be verified at a high level with reference to the RTL specification, independent of implementation details such as circuit design and transistor layout. The RTL specification also facilitates later hardware design of the processor.

Manually verifying the RTL specification of the processor architecture is prohibitively complex during the design of a modern microprocessor. Therefore, multiple test cases are typically generated to test the design. Each test case contains input instructions and may also contain the desired results or outputs. Once created, the test cases may be executed on a simulation of the RTL specification (often compiled to increase speed) and the results analyzed. Through that analysis, errors in the RTL specification, and potentially the processor architecture design, may be identified.

Many processors use multiple processor cores that execute instructions during processor operation. Cores of such processors are connected by an interface, such as a point-to-point (P2P) interface or a front side bus (FSB) interface, typically on a single chip. With such a configuration, the processor may be operated in a "lockstep" mode in which two or more of the processor cores (a master core and one or more slave cores) execute the same instruction stream each clock cycle. Given that the behavior of the cores is deterministic, the same output should result from each processor core operating in lockstep mode. One advantage of operating in lockstep mode is that if one of the cores experiences an error (e.g., a manufacturing defect, a stuck-at fault, a soft error from an alpha particle, a transient electrical failure, etc.), the other core(s), at least in theory, can continue to execute so that the processor can continue to operate. Assuming that the core that experienced the error has not failed completely, the operating system may be able to resynchronize that core so as to resume normal lockstep operation.

A "lockstep block" may be provided within the verification system that logically resides between the modeled processor cores and their interfaces. In such a case, the lockstep block can monitor outputs of the cores (e.g., data and/or error signals) such that the lockstep block can identify when core errors occur. If a self-detected (i.e., core-reported) error occurs, the lockstep block can shut down the failing core to avoid the output of erroneous signals to the remainder of the verification system. If a data mismatch as between the cores occurs (i.e., core divergence), the lockstep block can signal a system-wide alert to prevent system data corruption in that it is not known which of the cores is failing and which is operating correctly.

Within the verification system, some signals output from the lockstep block propagate to chip pads (or pins). Due to the fact that such signals may traverse circuitous paths through various different clock domains, the time at which such a signal will reach the pad is indeterminate, i.e., the arrival time cannot be determined with certainty at the time the signal is output. Given that it is important that the correct signal changes occur at the chip pads, it is desirable to confirm that those changes in fact occur. Unfortunately, however, the indeterminate nature of the signal timing renders it difficult to make that confirmation.

SUMMARY

In one embodiment, a system and method pertain to identifying an output signal having indeterminate timing, creating an expectation for a signal change associated with the output signal, and adding the expectation to an ordered list of expectations for the output signal.

In another embodiment, a system and method pertain to detecting a signal change, identifying a vector associated with the signal in which the change occurred, examining pending expectations of the vector until a mature expectation is identified, comparing an expected value contained in the mature expectation with the detected signal change, and reporting an error if the expected value does not match the detected signal change.

BRIEF DESCRIPTION OF THE DRAWINGS

The disclosed systems and methods can be better understood with reference to the following drawings. The components in the drawings are not necessarily to scale.

DETAILED DESCRIPTION

Figure 1:
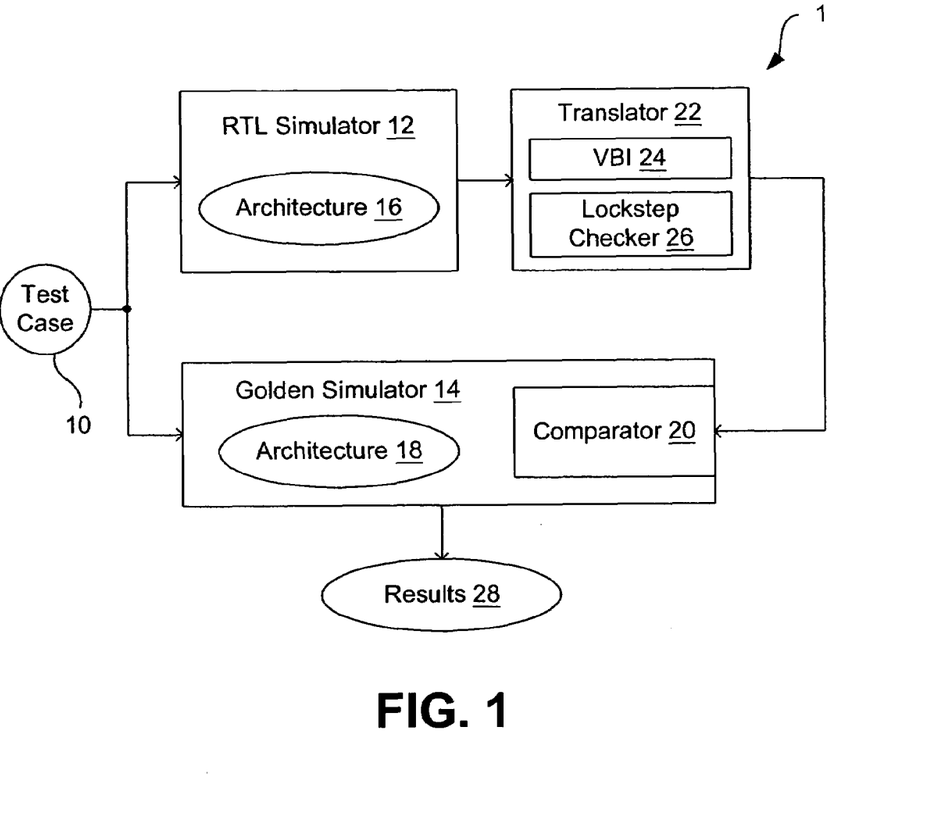
FIG. 1 is a block diagram of an embodiment of a system for verifying a processor architecture.

Disclosed are systems and methods for conducting future signal checks in a verification system. Referring to FIG. 1, a processor architecture verification system 1 is illustrated that verifies processor architecture by executing at least one test case 10 on both a register transfer language (RTL) simulator 12 that comprises a compiled version of the RTL specification, and a golden simulator 14 that comprises a relatively high-level program that emulates operation of the processor. It is noted that the golden simulator 14 is not required, but is shown and identified herein in that it may be useful for in some aspects of processor architecture verification.

The RTL simulator 12 and the golden simulator 14 both simulate the desired processor architecture 16 and 18, respectively. The RTL simulator 12 and the golden simulator 14 may, however, comprise different output interfaces. For instance, the RTL simulator 12 may comprise a point-to-point (P2P) link network output interface while the golden simulator 14 may comprise a front side bus (FSB) output interface. Alternative arrangements are possible, however. For example, the RTL simulator 12 could instead comprise an FSB output interface. As is described in greater detail below, the modeled architecture 16 includes multiple processor cores that enable lockstep operation, and a lockstep block that monitors the operation of the cores to identify certain errors in core operation when they arise.

Because the output of the RTL simulator 12 and the golden simulator 14 may be in different formats, a translator 22 may be provided that translates the output of the RTL simulator to match the format of the golden simulator 14. The translated output of the RTL simulator 12 can then be compared with the output of the golden simulator 14 in a comparator 20 to produce test results 28. In the illustrated embodiment, the comparator 20 comprises part of the golden simulator 14. Alternatively, however, the comparator 20 may be independent of the golden simulator 14. If any differences in the outputs are detected by the comparator 20, the processor designer is alerted to the fact that an error may exist in the RTL simulator 12 or the golden simulator 14 or both. This enables test cases to be applied to the processor architecture quickly while minimizing required designer attention.

In some embodiments, the translator 22 de-pipelines the output of the RTL simulator 12 for comparison with the output of the golden simulator 14. In such an embodiment, the translator 22 may be referred to as a "depiper." Such de-pipelining may be necessary because the golden simulator 14 is typically more abstract than the RTL simulator 12. For instance, the golden simulator 14 may not include the same level of detail about the processor architecture being verified as does the RTL simulator 12. The result is that the output of the RTL simulator 12 may not directly match the output of the golden simulator 14 even though the underlying architecture 16, 18 is the same and the test case 10 is identical. A detailed example of a suitable depiper is described in U.S. Pat. No. 5,404,496, which is incorporated by reference herein for all that it discloses.

In the embodiment shown in FIG. 1, the translator 22 comprises a virtual bus interface (VBI) 24 that translates transactions from the RTL simulator 12 from P2P link network format to FSB format for comparison with the FSB format output of the golden simulator 14. In addition to the VBI 24, the translator 22 comprises a lockstep checker 26 that, as is described in greater detail below, monitors the operation of multiple processor cores (modeled in the architecture 16) as well as the lockstep block when the modeled processor operates in the lockstep mode. As is described in the following, the lockstep checker 26 can further schedule future signal checks to facilitate confirmation that signal changes occur at output pads (or pins) of the modeled processor "chip." Although such signal checks are described herein as being scheduled for signals output from lockstep block, such signal checks can be scheduled for other signals having indeterminate timing, if desired. Although the lockstep checker 26 is shown as comprising part of the translator 22 (e.g., depiper), it is noted that the lockstep checker may be located anywhere (including independent of the translator) in which it may monitor the operation of processor cores and lockstep block during lockstep mode operation. In most embodiments, however, the checker 26 is implemented independent of the golden simulator 14 both to avoid the complexity associated therewith and due to the fact that the golden simulator 14 may be too high level to evaluate (or even be aware of) lockstep operation. In such cases, the lockstep checker 26 may adjust the output (e.g., state-update packets) so as to fool the golden simulator 14 into "thinking" that only one processor core is running when more than one such core is operating in lockstep mode.

The RTL simulator 12 and the golden simulator 14 are operated relative to information specified by the test case 10. By way of example, the test case 10 comprises a program to be executed on the processor architecture 16 and 18 in the RTL simulator 12 and golden simulator 14, respectively. The test case program is a memory image of one or more computer executable instructions, along with an indication of the starting point, and may comprise other state specifiers such as initial register contents, external interrupt state, etc. Accordingly, the test case 10 defines an initial state for the processor that is being simulated and the environment in which it operates. The test case 10 may be provided for execution on the RTL simulator 12 and golden simulator 14 in any suitable manner, such as an input stream or an input file specified on a command line.

The RTL specification used to generate the RTL simulator 12 may be implemented using any suitable tool for modeling the processor architecture 16, such as any register transfer language description of the architecture, which may be interpreted or compiled to act as a simulation of the processor. The RTL simulator 12 of an exemplary embodiment contains an application program interface (API) that enables external programs, including the translator 22, to access the state of various signals in the simulated processor such as register contents, input/outputs (I/Os), etc. Thus, the output of the RTL simulator 12 may be produced in any of a number of ways, such as an output stream, an output file, or as states that are probed by an external program through the API. The RTL simulator 12 may simulate any desired level of architectural detail, such as the processor cores, or the processor cores and one or more output interfaces.

As noted above, the golden simulator 14, when provided, is a relatively abstract, higher-level simulation of the processor architecture, and therefore may be less likely to include faults or errors than the RTL simulator 12. The golden simulator 14 is written using a high-level programming language such as C or C++. Alternatively, the golden simulator 14 may be written using any other suitable programming language, whether compiled, interpreted, or otherwise executed. Whereas the RTL simulator 12 actually matches the details and reality of the processor being simulated to a great degree, the golden simulator 14 typically is a conceptual model without concern for timing considerations arising from physical constraints.

The translator 22 (e.g., depiper) tracks instructions as they flow through the RTL simulator 12 and notes their effects on the simulated processor. The translator 22 may generate a retire record for each instruction that indicates when the instruction started executing and when it completed or retired, along with the states that changed during execution. In some cases, if state changes cannot be tracked to a single instruction, the depiper may generate a generic report identifying an altered state and the instructions that may have caused the change.

In some embodiments in which the translator 22 comprises a depiper, the VBI 24 works in parallel with the depiper, with the depiper producing state change records such as depiper retire records, and the VBI producing state change records in the form of synthesized FSB transactions. Although the VBI 24 may read the P2P packets directly from the P2P interface on the RTL simulator 12 and may access information about the RTL simulated processor via the API, the VBI may also access information about the RTL simulated processor that is stored in the depiper. In some embodiments, the depiper contains structures that monitor the simulated processor cores' states. In such cases, it may be convenient for the VBI 24 to access some information from the depiper for use in reporting or synthesizing fields used in the FSB phases.

In some embodiments in which the translator 22 comprises a depiper, the depiper first reads the P2P output of the RTL simulator 12 and de-pipelines the P2P transactions, generating a de-pipelined version of the P2P transactions. The VBI 24 then reads the de-pipelined version of the P2P transactions from the depiper and generates corresponding FSB transactions for the comparator 20. The de-pipelined P2P transactions may be transferred from the depiper to the VBI 24 in any suitable manner, such as across a virtual P2P link or in a file containing depiper retire records.

Notably, the VBI 24 is not limited to use with verification systems including a depiper. Verification systems having the same level of pipelining detail in both the RTL simulator 12 and the golden simulator 14 may not need a depiper, but a VBI 24 still enables processor simulators with different output interfaces to be used together. If the translator 22 comprises a depiper, the VBI 24 may access information stored in the depiper as described above, or may be implemented as a module in the depiper for convenience. In embodiments in which the translator 22 does not include a depiper, the VBI 24 in the translator still directly connects to the P2P output of the RTL simulator 12, but obtains other information about the state of the simulated processor from the RTL simulator via the API. The VBI 24 uses the resulting P2P packets and other information to produce translated FSB transactions in whatever manner required by the comparator 20, such as generating a virtual FSB connection to the comparator, or generating output reports containing records of FSB format transactions that may be read by the comparator.

Figure 2:
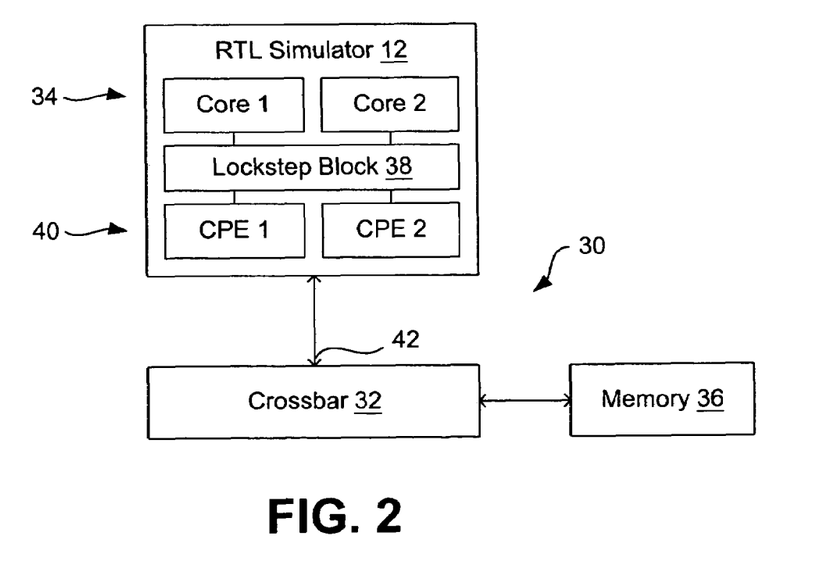
FIG. 2 is a block diagram illustrating an example output interface of an RTL simulator shown in FIG. 1.

FIG. 2 illustrates an example output interface of the RTL simulator 12. As shown in that figure, the RTL simulator 12 of the illustrated embodiment uses one or more ports into a point-to-point (P2P) link network 30 shown in FIG. 2. The P2P link network 30 is a switch-based network with one or more crossbars 32 acting as switches between components such as processor cores 34 (i.e., Core 1 and Core 2 in the embodiment of FIG. 2), memory 36, or other devices (not shown). Transactions are directed to specific components and are appropriately routed in the P2P link network 30 by the crossbar 32. The routing provided by the crossbar 32 reduces the load on the system components because they do not need to examine each broadcast block of information. Instead, each component ideally receives only data meant for that component. Use of the crossbar 32 also avoids bus loading issues, thereby facilitating scalability.

Transactions on the P2P link network 30 are packet-based, with each packet containing a header comprising routing and other information. Packets containing requests, responses, and data are multiplexed so that portions of various transactions may be executed with many others at the same time. Transmissions are length-limited, with each length-limited block of data called a "flit." Thus, a long packet will be broken into several flits, and transactions will typically require multiple packets. Therefore, the P2P link network 30 is monitored over time to collect the appropriate P2P packets until enough information exists for a corresponding FSB phase to be generated by the translator 22. To achieve such monitoring, the translator 22 monitors a port 42 on the crossbar 32 that is connected to the cores 34 in the RTL simulator 12. An exemplary read operation in a P2P link network is described in U.S. patent application Ser. No. 10/700,288, filed Nov. 3, 2003, which is incorporated herein for all that it discloses.

As is further illustrated in FIG. 2, the RTL simulator 12 includes a lockstep block 38 that resides between the processor cores 34 and their respective core protocol engines (CPEs) 40. The lockstep block 38 monitors outputs of the modeled processor cores 34 (i.e., Core 1 and Core 2 in the embodiment of FIG. 2) to identify when core errors occur. Such errors typically come in two main types. The first type of error comprises an error that the cores 34 detect, i.e., self-detected errors. In such cases, the core 34 experiencing the error (i.e., the failing core) outputs an error message that is intercepted by the lockstep block 38, and the lockstep block ensures that no data from the failing core is output from the processor. In addition, the lockstep block 38 issues a system-level alert that signifies that the failed core must be resurrected to resume lockstep operation.

The other main type of error occurs when no error is detected by a processor core, but different data is output from the cores that are operating in lockstep mode. As noted above, the outputs from the cores should be identical in that the cores' behavior is deterministic and because the cores execute the same instruction streams. Accordingly, when different outputs are detected by the lockstep block 38, one or more of the cores is experiencing an error. The lockstep block 38 can optionally raise a system-wide error on the interface in such a case and further execution can be halted, if desired, so that neither core is allowed to send data to the system to prevent system data corruption in that it is not known which of the cores is failing and which is operating correctly.

It is desirable to analyze the lockstep block's behavior to properly verify a design of a processor. The operation of the lockstep block 38 can be monitored and analyzed using the lockstep checker 26. The lockstep checker 26 implements a software model of the lockstep state machine that describes the proper operation the lockstep block 38 in various system states, and monitors the RTL simulator 12 signals that are output from the cores and that are input into and output out of the lockstep block. From those interface signals, the lockstep checker 26 can evaluate the operation of the lockstep block 38 and identify errors in that operation when applicable. Such an error identifies a potential flaw in the design of the physical lockstep block that will be used in the actual processor. A detailed description of such evaluation of the lockstep block 38 using the lockstep checker 26 is described in U.S. patent application Ser. No. 10/717,253, filed Nov. 19, 2003, which is incorporated herein for all that it discloses.

As noted above, some signals output from the lockstep block propagate to chip pads of the processor chip. Because the timing for those signals is indeterminate, steps must be taken to account for that indeterminate behavior if signal changes at the pads are to be confirmed. As is described in the following, the lockstep checker 26 can be used to identify changes in a signal that is sent to the chip pads and generate expectations for corresponding signal changes at the chip pads. For instance, the lockstep checker 26 can define a time window in which the signal at the pad is expected to change to a given value. Once that time window is defined, the lockstep checker 26 can confirm that the change did or did not occur when expected. In the former case, the signal change is confirmed. In the latter case, the signal change did not occur as expected and the lockstep checker 26 can signal an error.

Figure 3A:
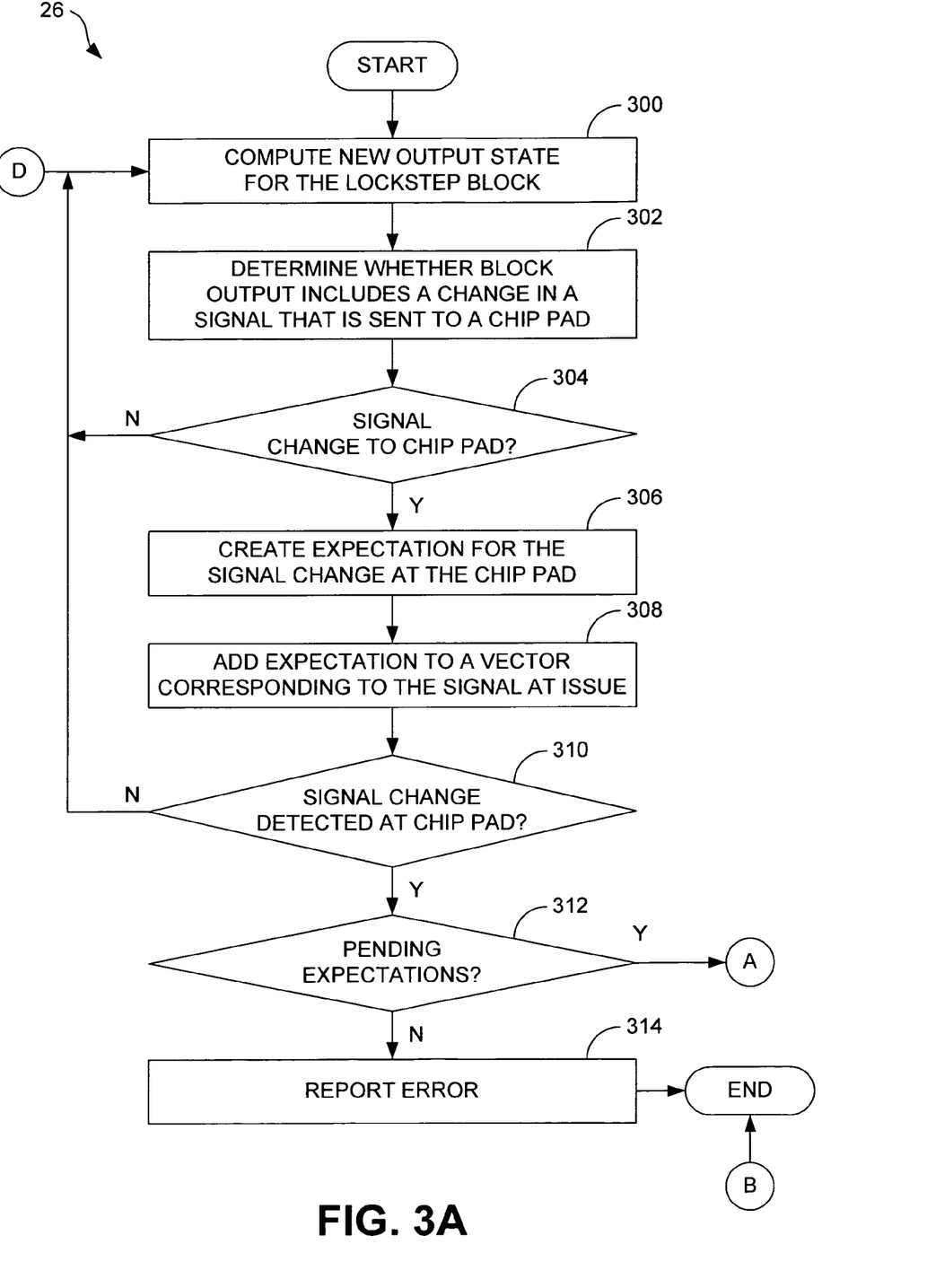
FIGS. 3A–3C comprise a flow diagram of an embodiment of a first method for conducting future signal checks.
Figure 3B:
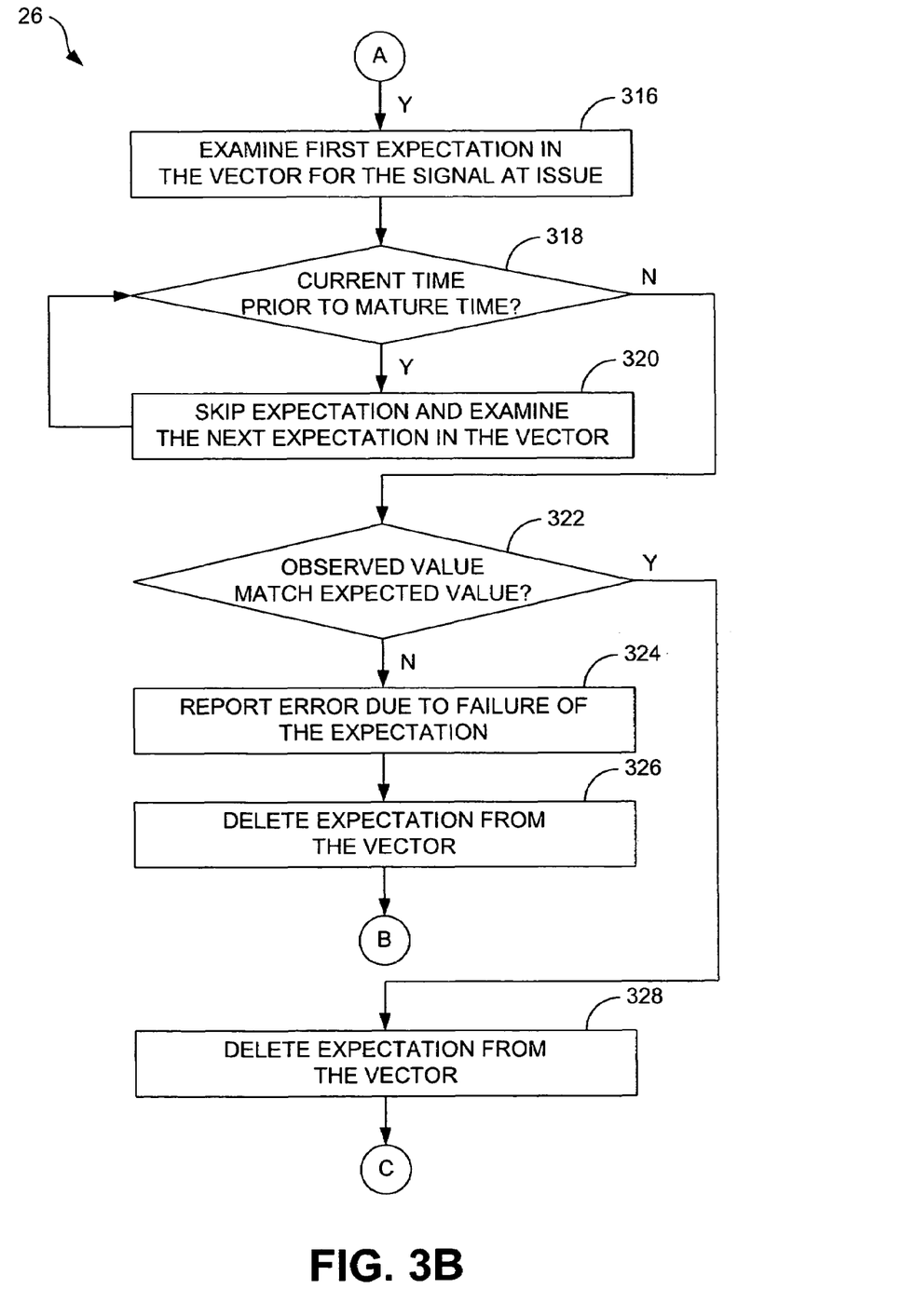
Figure 3C:
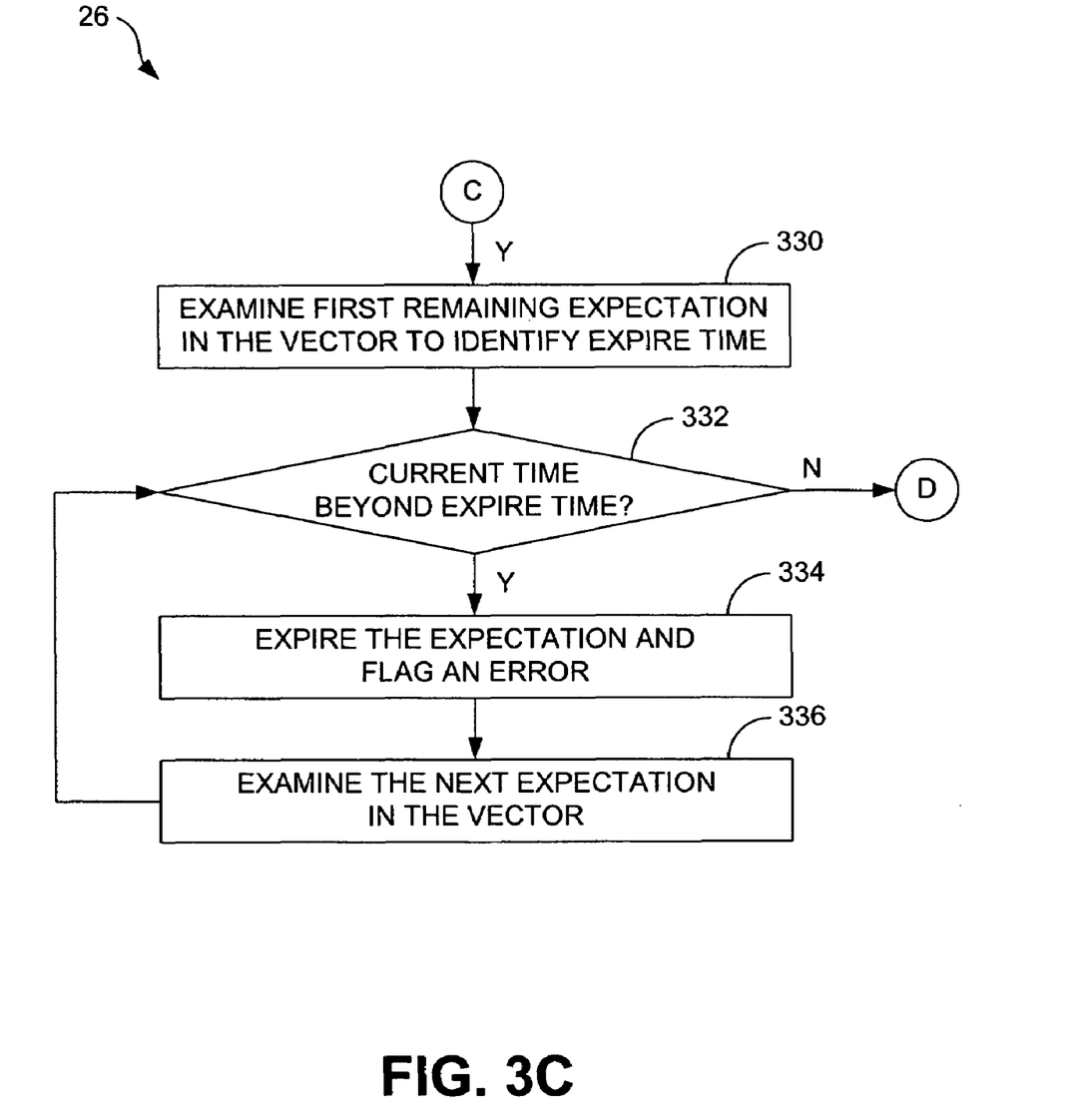

FIGS. 3A–3C describe an example embodiment of conducting future signal checks. More particularly, FIGS. 3A–3C describe an example of operation of the lockstep checker 26 in detecting a signal that is sent to a chip pad and creating an expectation for a signal change that enables the checker to determine whether or not the change in fact occurred at the chip pad.

Beginning with block 300 of FIG. 3A, the lockstep checker 26 computes a new output state for the lockstep block. That computation is made, for instance, once each clock cycle and comprises identifying the signals output from the lockstep block. Through that identification, the lockstep checker 26 can, as indicated in block 302, determine whether the lockstep block output includes a change in a signal that is sent to a chip pad. The nature of the change depends upon the particular signal that is being output from the lockstep block. By way of example, the signal change can simply comprise a change of an error signal from a logic 0 to a logic 1 to indicate an internal error to a chipset.

Next, with reference to decision block 304, the lockstep checker 26 determines whether the output state reflects such a signal change. As stated above, the timing for such a change to occur is indeterminate due given that the signal may traverse various clock domains before reaching the chip pad. If no such signal changes are identified, there are no new expectations for signal changes at the chip pad and flow returns to block 300 at which a new output state is computed for the lockstep block (e.g., for the next clock cycle). If, on the other hand, the output state does reflect a signal change that should occur at the chip pad, the lockstep checker 26 creates an expectation for the signal change at the chip pad, as indicated in block 306, which will enable confirmation that the signal change occurs at the chip pad (or does not).

The expectation can take various forms. By way of example, the expectation comprises a data structure that defines a time window during which the signal change is expected. Such a data structure can be configured as follows:

```
struct future_value {
  int sched_time;
  int mature_time;
  int expire_time;
  int to_value;
}
``` where int sched_time is the current clock time (at which the expectation was created); int mature_time is the future time at which the expectation will become active or "mature"; int expire_time is the future time at which the expectation will expire; and int to_value is the new value to which the signal should change at the chip pad. Accordingly, the mature_time and the expire_time together define a time period during which the signal at the chip pad is expected to change to the to_value. If the signal change does not occur within that time period, the expectation fails and an error may be reported.

The data structure, or simply "expectation," can be used as element of a vector for a given signal output from the lockstep block. Therefore, as indicated in block 306 of FIG. 3A, the newly created expectation can be added to a vector that corresponds to the signal at issue. Such a vector may be configured as: <exp1, exp2, exp3, . . . expN>. Therefore, a vector results that comprises various expectations arranged in the order in which the were created (i.e., scheduled).

Expectations may be created for each signal change that is observed by the lockstep checker 26. Once expectations have been created, the lockstep checker 26 may later enter a "check" phase of operation in which the checker identifies signal changes at the chip pad as they occur and checks them against expected changes contained in the vector for the signal at issue. Therefore, with reference to decision block 310, the lockstep checker 26 first determines whether a signal change is detected at the chip pad. If not, no checking is possible at this time and flow returns to block 300 (at which further expectations may be created). If a signal change is detected by the lockstep checker 26, however, flow continues to decision block 312 at which the lockstep checker determines whether there an pending expectations contained in the vector for the signal in which the observed change occurred. If there are no such pending expectations, an unanticipated signal change has occurred, which indicates a failure. In such a case, the lockstep checker 26 reports an error, as indicated in block 314, and flow for the current session may be terminated for the purpose of identifying the reason for the error.

If there are pending expectations, however, flow continues to block 316 of FIG. 3B at which the lockstep checker 26 examines the first expectation in the vector for the signal at issue. In particular, the lockstep checker 26 identifies the various data contained within the expectation including the mature_time, the expire_time, and the to_value, for the purpose of comparing that information with the chip pad signal change and the time at which that change was observed. Referring to decision block 318, the lockstep checker 26 determines whether the current time is prior to the mature time. In other words, the checker 26 determines whether the mature time has arrived. If not, the expectation has not yet matured (is not ripe), and therefore the expectation is assumed to pertain to a different signal change. In such a case, flow continues to block 320 at which the lockstep checker 26 skips that expectation (the first expectation in this case) and examines the next expectation in the vector. Returning to decision block 318, if the current time is less than the mature time, that expectation is skipped and the process continues until an expectation is identified in which the current time is at or beyond the mature time.

Once an expectation has been discovered that identifies a mature time that has arrived, flow continues to decision block 322 at which the lockstep checker 26 determines whether the observed signal change value matches the expected value reflected in the expectation (i.e., data structure). If the two values match, the expectation is satisfied and, as indicated in block 324, the expectation is deleted from the vector. At this point, flow continues to block 330 of FIG. 3C described below. If, on the other hand, the two values do not match, i.e., the observed signal change value is not the same as the expected to_value, the expectation fails and, as indicated in block 320, the lockstep checker 26 reports an error. As in the case in which the expectation was satisfied, the expectation is deleted from the vector (block 322). Due to the error, however, flow for the session is terminated (see FIG. 3A).

Referring to block 330 of FIG. 3C, the lockstep checker 26 can further clear expired expectations from the vector. To do this, the lockstep checker 26 first examines the first remaining expectation of the signal vector to identify its expire time. With that information, the lockstep checker 26 can determine whether the current time is beyond the expire time (i.e., whether the expectation has expired), as indicated in decision block 332. If not, the remaining expectations are assumed to still be pending and flow returns to block 300 of FIG. 3A. If the expire time has passed, however, flow continues to block 334 at which the expectation is expired (i.e., removed from the vector) and an error is flagged to indicate that the expectation was never fulfilled. Next, with reference to block 336, the next expectation is examined. This process continues with all expired expectations being removed from the vector. By way of example, the above-described expectation expiration is performed by the lockstep checker 26 each clock tick.

Figure 4:
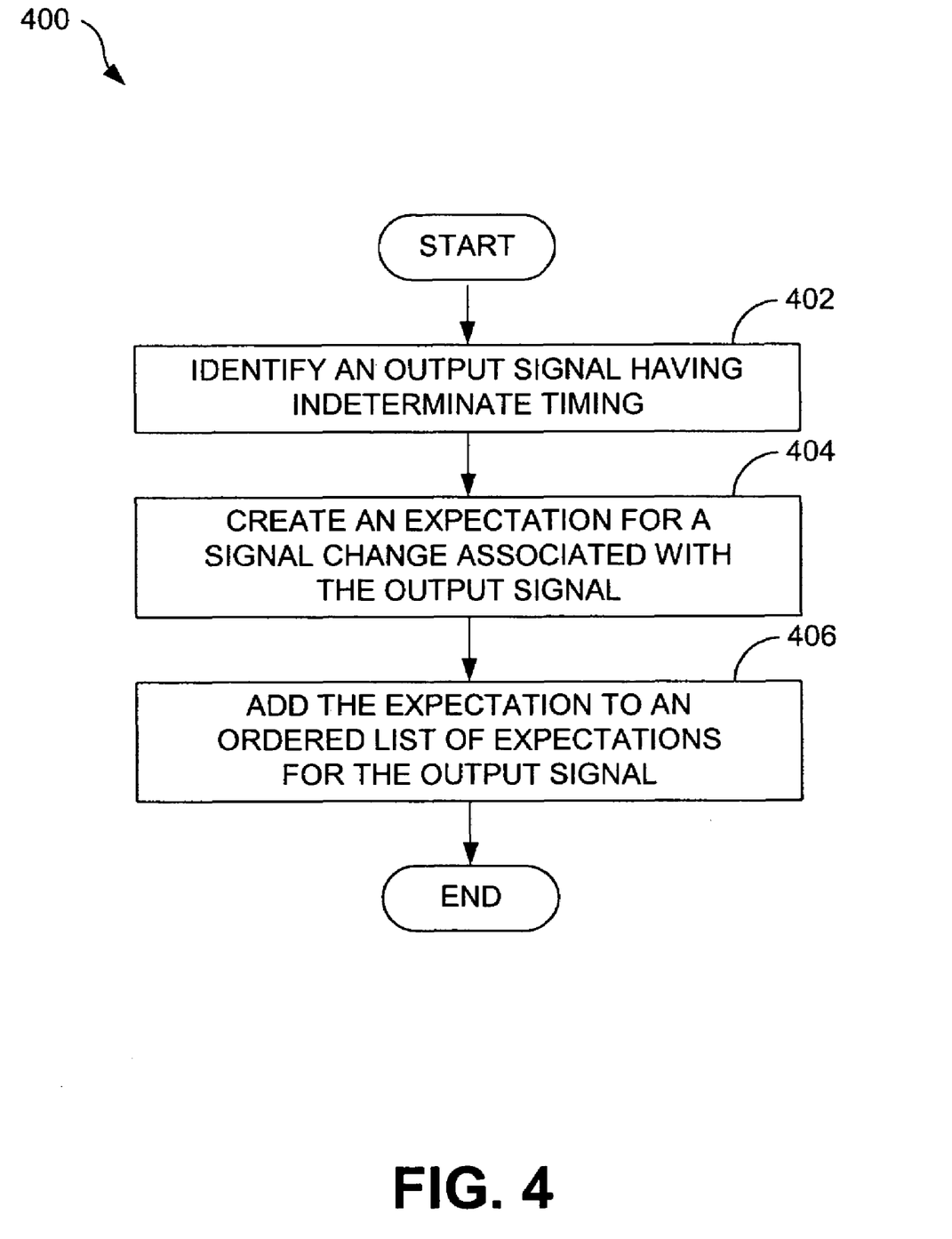
FIG. 4 is a flow diagram of an embodiment of a second method for conducting future signal checks.

In view of the above, a method for conducting future signal checks may be described as provided in FIG. 4. With reference to that figure, the method 400 comprises identifying an output signal having indeterminate timing (402), creating an expectation for a signal change associated with the output signal (404), and adding the expectation to an ordered list of expectations for the output signal (406).

Figure 5:
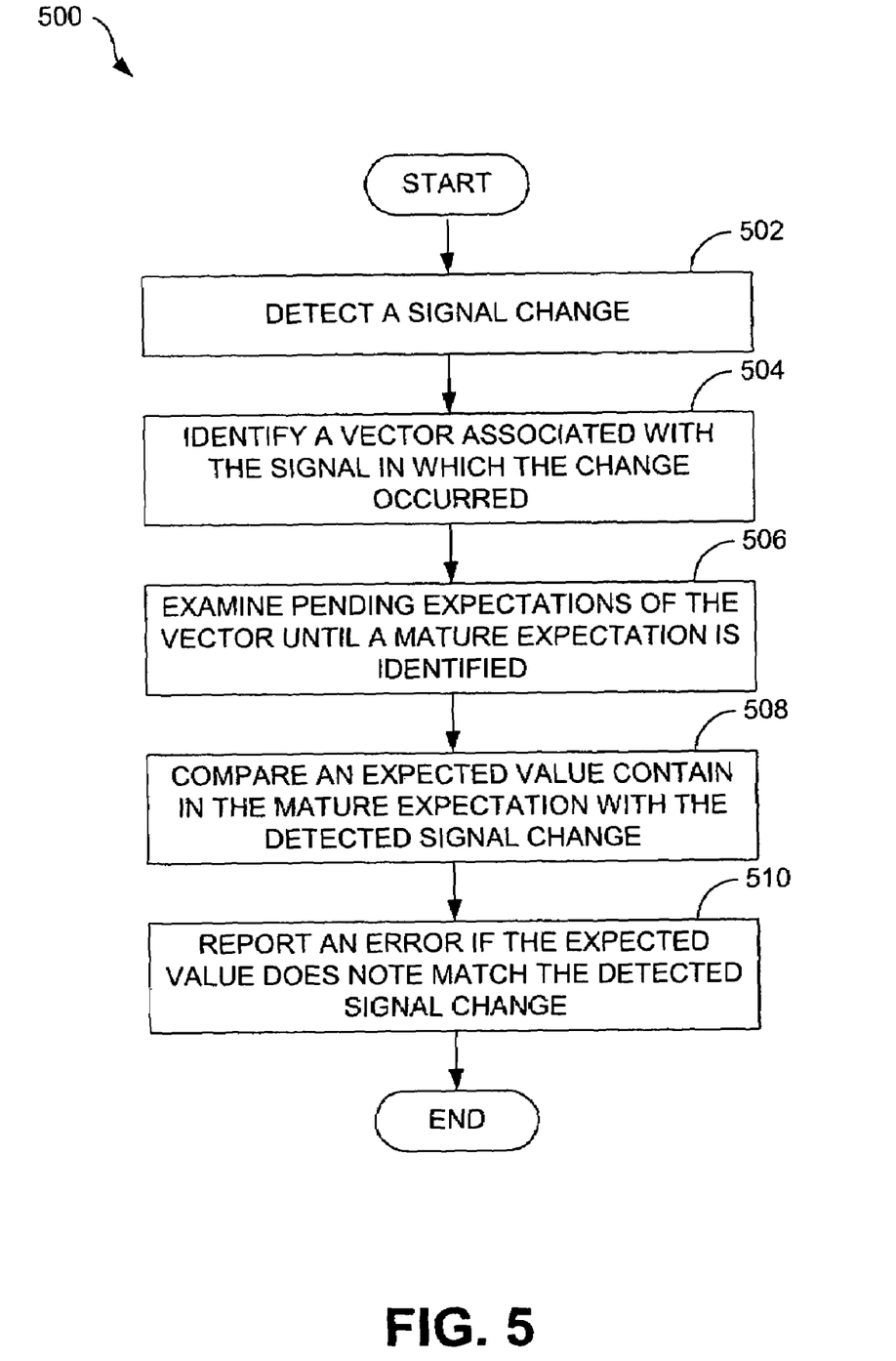
FIG. 5 is a flow diagram of an embodiment of another method for conducting future signal checks.

Another method for conducting future signal checks is illustrated in FIG. 5. That method 500 comprises detecting a signal change (502), identifying a vector associated with the signal in which the change occurred (504), examining pending expectations of the vector until a mature expectation is identified (506), comparing an expected value contained in the mature expectation with the detected signal change (508), and reporting an error if the expected value does not match the detected signal change (510).

Figure 6:
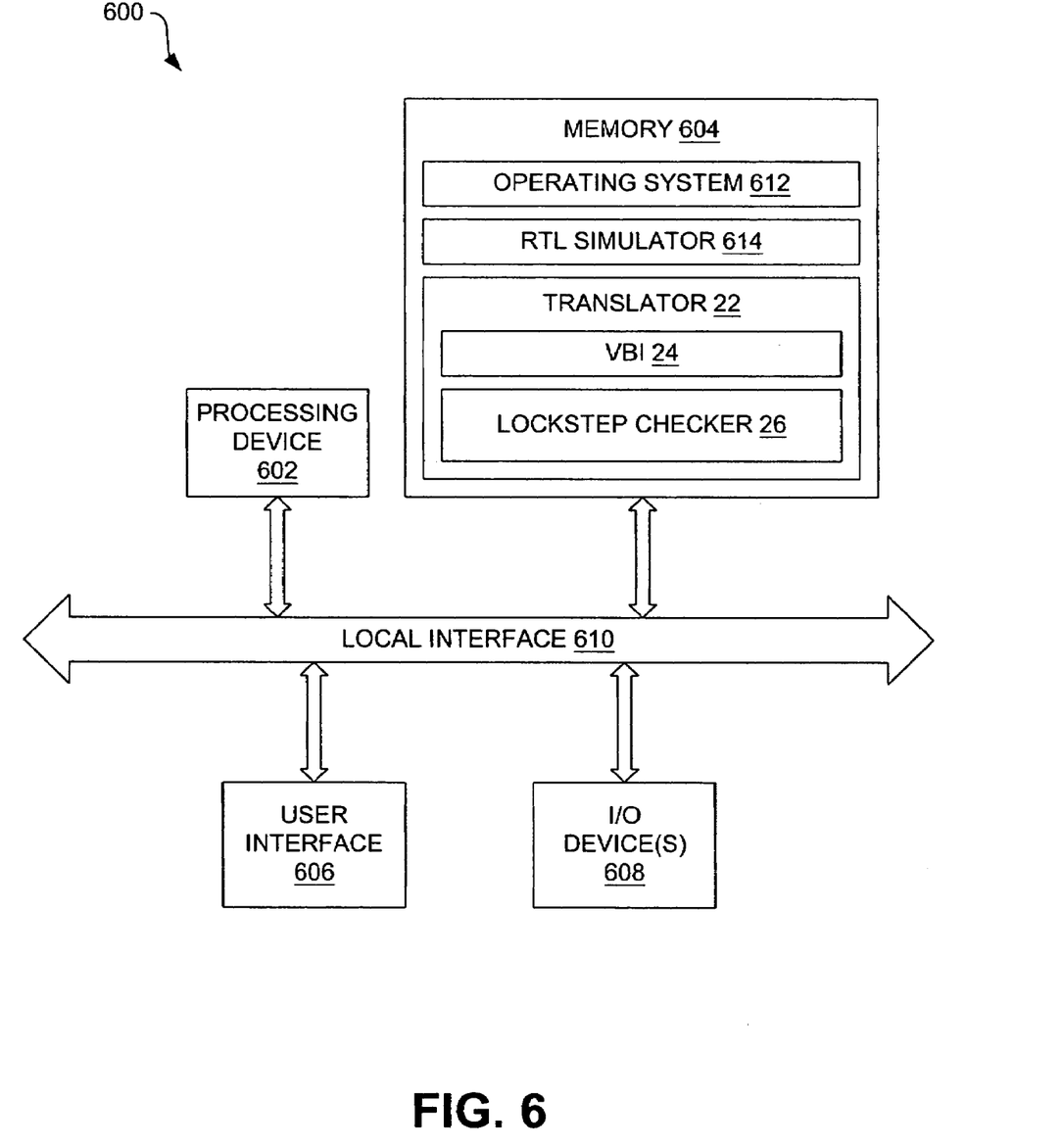
FIG. 6 is a block diagram of an embodiment of a computer system in which future signal checks can be conducted.

FIG. 6 is a block diagram of a computer system 600 in which the foregoing systems can execute and, therefore, a method for conducting future signal checks can be practiced. As indicated in FIG. 6, the computer system 600 includes a processing device 602, memory 604, at least one user interface device 606, and at least one input/output (I/O) device 608, each of which is connected to a local interface 610.

The processing device 602 can include a central processing unit (CPU) or an auxiliary processor among several processors associated with the computer system 600, or a semiconductor-based microprocessor (in the form of a microchip). The memory 604 includes any one or a combination of volatile memory elements (e.g., RAM) and non-volatile memory elements (e.g., read only memory (ROM), hard disk, etc.).

The user interface device(s) 606 comprise the physical components with which a user interacts with the computer system 600, such as a keyboard and mouse. The one or more I/O devices 608 are adapted to facilitate communication with other devices. By way of example, the I/O devices 608 include one or more of a universal serial bus (USB), a Firewire, or a small computer system interface (SCSI) connection component and/or network communication components such as a modem or a network card.

The memory 604 comprises various programs including an operating system 612 that controls the execution of other programs and provides scheduling, input-output control, file and data management, memory management, and communication control and related services. In addition to the operating system 612, the memory 604 comprises the RTL simulator 12 and the translator 22 identified in FIG. 1. As is shown in FIG. 6, the translator 22 includes the VBI 24 and the lockstep checker 26, which have been described in detail above.

Various programs (i.e., logic) have been described herein. Those programs can be stored on any computer-readable medium for use by or in connection with any computer-related system or method. In the context of this document, a computer-readable medium is an electronic, magnetic, optical, or other physical device or means that contains or stores a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

We claim:

1. A method for performing testing of a processor design, the method comprising:
   determining a signal change that should be output by a lockstep block of a simulated processor, the lockstep block being configured to monitor the operation of multiple-cores of the simulated processor that are configured to execute commands in lockstep;
   creating an expectation for the signal change that defines a time window in which the signal change is expected to be output by the lockstep block, the expectation comprising an expected signal change value;
   if the expectation is mature, determining whether a signal change has been output by the lockstep block;
   determining whether a detected signal change value matches the expected signal change value; and
   if the detected signal change value does not match the expected signal change value of the first expectation, reporting an error.

2. The method of claim 1, wherein the signal change comprises a signal change that is sent to a chip pad of the simulated processor.

3. The method of claim 1, wherein creating an expectation comprises creating a data structure that defines a time window in which the signal change is expected to be output by the lockstep block.

4. The method of claim 3, wherein the data structure includes a mature time and an expire time that together define the time window.

5. The method of claim 1, further comprising adding the expectation to a signal vector that includes multiple expectations pertaining to lockstep block signal changes arranged in order of creation.

6. The method of claim 1, further comprising examining the expectations of the signal vector in sequence until a mature expectation is identified.

7. The method of claim 1, further comprising deleting the created expectation from the signal vector.

8. The method of claim 1, further comprising expiring expectations from the signal vector that have an expire time that has passed and flagging an error.

9. A signal check system stored on a computer-readable medium executed by a computer, the system comprising:
   logic configured to identify a signal chance that should be output from a lockstep block configured to monitor the operation of multiple cores of a simulated processor that are configured to execute commands in lockstep, the signal change being directed to a chip pad of the simulated processor;
   logic configured to create an expectation for the signal change at the chip pad, the expectation defining a time window in which the signal change is expected to be output by the lockstep block;
   logic configured to, when the expectation is mature, detect a later signal change output by the lockstep block at the chip pad;
   logic configured to compare an expected value of the mature expectation with the later signal change to determine whether they match; and
   logic configured to report an error if the expected value of the mature expectation does not match the detected signal change.

10. The system of claim 9, wherein the logic configured to create an expectation comprises logic configured to create a data structure comprising a mature time and an expire time that together define a time window in which a signal change is expected at the chip pad.

11. The system of claim 10, wherein the logic configured to create an expectation is further configured to add the data structure to a vector associated with the identified signal.

12. The system of claim 9, further comprising logic configured to delete mature expectations from the signal vector.

13. The system of claim 9, further comprising logic configured to expire expectations from a signal vector that have expire times that have passed and flag an error.

14. A method for performing a test of a processor design, the method comprising:
  determining signal changes that should be output from a lockstep block of a simulated processor to a chip pad of the simulated processor, the lockstep block being configured to monitor the operation of multiple cores of the simulated processor that are configured to execute commands in lockstep;
  creating expectations for the signal changes, the expectations comprising data structures that define a time window during which the signal changes are expected to be output by the lockstep block and a value that the signal change is expected to have;
  adding the expectations to a signal change vector;
  detecting that a signal change has been output by the lockstep block and a value of the detected signal change;
  determining whether there are pending expectations contained in the signal change vector and, if so, examining a first expectation in the vector to determine whether the first expectation is mature;
  if the first expectation is mature, determining whether the detected signal change value matches an expected signal change value of the first expectation;
  if the detected signal change value does not match the expected signal change value of the first expectation, reporting an error.

15. The method of claim 14, further comprising deleting the first expectation from the signal change vector.

16. The method of claim 14, further comprising:
  if the examined expectation is not mature, examining the next expectation in the signal change vector to determine whether the next expectation is mature;
  if the next expectation is mature, determining whether the detected signal change value matches an expected signal change value of the next expectation; and
  if the detected signal change value does not match the expected signal change value of the next expectation, reporting an error.

17. The method of claim 14, further comprising:
  examining other expectations of the signal change vector to determine whether the vector contains an expired expectation; and
  if the vector is determined to contain an expired expectation, reporting an error to indicate that the expired expectation was never fulfilled.

18. The method of claim 17, further comprising deleting the next expectation from the signal change vector.

* * * * *

UNITED STATES PATENT AND TRADEMARK OFFICE
CERTIFICATE OF CORRECTION

| | | |
|---|---|---|
| PATENT NO. | : 7,210,111 B1 | Page 1 of 1 |
| APPLICATION NO. | : 10/838761 | |
| DATED | : April 24, 2007 | |
| INVENTOR(S) | : Zachary Steven Smith et al. | |

It is certified that error appears in the above-identified patent and that said Letters Patent is hereby corrected as shown below:

In column 10, line 10, in Claim 1, delete "multiple-cores" and insert -- multiple cores --, therefor.

In column 10, line 47, in Claim 9, delete "chance" and insert -- change --, therefor.

Signed and Sealed this

Nineteenth Day of August, 2008

JON W. DUDAS
*Director of the United States Patent and Trademark Office*